United States Patent [19]

Fuse

[11] Patent Number: 4,935,595
[45] Date of Patent: Jun. 19, 1990

[54] ELECTRODE TIP REPLACEMENT APPARATUS FOR WELDING GUN

[75] Inventor: Genzo Fuse, Saitama, Japan

[73] Assignee: Honda Giken Kogyo Kabushiki Kaisha, Tokyo, Japan

[21] Appl. No.: 304,452

[22] Filed: Feb. 1, 1989

[30] Foreign Application Priority Data

Feb. 4, 1988 [JP] Japan .................................. 63-22757

[51] Int. Cl.$^5$ .......................... B23K 9/32; B23Q 3/00; B23B 31/12
[52] U.S. Cl. .................................. 219/86.25; 29/568; 279/35; 279/106
[58] Field of Search .................... 279/33–35, 279/106–107; 29/568; 219/86.25

[56] References Cited

U.S. PATENT DOCUMENTS

| 6,681 | 8/1849 | Martin et al. ........................... 279/35 |
| 1,481,191 | 1/1924 | Elliott et al. ........................ 279/33 X |
| 2,667,356 | 1/1954 | Forward ........................... 279/106 X |
| 2,890,888 | 6/1959 | Damijonaitis ..................... 279/33 X |
| 3,016,245 | 1/1962 | Von Zelewsky ..................... 279/106 |
| 4,310,958 | 1/1982 | Balaud et al. ....................... 29/26 A |
| 4,637,121 | 1/1987 | Wortmann .............................. 29/568 |
| 4,641,413 | 2/1987 | Hallgrist ............................... 29/568 |
| 4,766,282 | 8/1988 | Riordan et al. .................. 219/86.25 |

FOREIGN PATENT DOCUMENTS

| 0200162 | 11/1986 | European Pat. Off. . |
| 75308 | 10/1893 | Fed. Rep. of Germany ........ 279/34 |
| 2372 | of 1891 | United Kingdom .................. 279/34 |

Primary Examiner—George H. Miller, Jr.
Attorney, Agent, or Firm—Armstrong, Nikaido, Marmelstein, Kubovcik & Murray

[57] ABSTRACT

An electrode tip replacement apparatus for a welding gun comprising a housing having a through-hole through which an electrode tip attached to a gun arm of a welding gun can be inserted, a chuck member in such through-hole and having a ring shaped cam rotated by a driving source and a plurality of chucking claws pivotally attached for engaging and rotating an electrode tip inserted through said through-hole for removing the electrode tip from the welding gun arm.

2 Claims, 3 Drawing Sheets

ELECTRODE TIP REPLACEMENT APPARATUS FOR WELDING GUN

FIELD OF THE INVENTION

This invention relates to an electrode tip replacement apparatus for replacing the electrode tip attached to a gun arm of a welding gun with a new tip.

BACKGROUND OF THE INVENTION

There has heretofore been known a replacement apparatus for replacing electrode tip of a welding gun, as disclosed in the Japanese Unexamined Utility Model Registration Application Publication, Jikkai Sho 62-165084. In such apparatus, a pair of electrode tips, attached to a pair of gun arms of a welding gun, are each provided with an engagement portion. An electrode coupler connects both the electrode tips to each other by engaging with the engagement portions when the welding gun is applied with pressure. The electrode tips can be pulled off from the respective gun arms, when the welding gun is operated, to open the gun arms.

PROBLEMS TO BE SOLVED BY THE INVENTION

Generally, an electrode tip is held in place in a gun arm by having a tapered tail end fitted into a tapered hole provided in the front-end holding portion of the gun arm. The repeated application of welding pressure, by a welding gun causes the tapered end portion to eat into the tapered hole deeper and deeper. When attempt is made to pull the electrode tips, coupled to each other by means of the electrode coupler, from the gun arms simply by opening the welding gun, as in the foregoing prior art, it is very likely that the gun arms will be subjected to excessive force and, consequently, become deformed. In addition, an electrode tip provided with such an engagement portion has to be specially manufactured and this results in a high manufacturing cost.

It is, therefore, an object of the present invention to provide an apparatus which does not require a specially manufactured electrode tip and can remove an ordinary electrode tip from a gun arm without subjecting the gun arm to an undue or excessive force, thereby solving the above-noted problems.

BRIEF DESCRIPTION OF THE INVENTION

To achieve the above object, in the instant invention an electrode tip replacement apparatus is provided which comprises: a housing having a through-hole through which an electrode tip, attached to a gun arm of a welding gun can be inserted; a chuck member for holding the electrode tip, positioned in the housing concentric with the through-hole; and a driving source for rotating the chuck member. In accordance with a second aspect of the invention, the chuck member comprises a ring-shaped rotary cam rotated by the driving source, an inner ring disposed along the inner circumference of the rotary cam and relatively rotatable with respect to the cam and a plurality of chucking claws pivotally attached to the inner ring so as to be swingable in the radial direction. The rotary cam has, formed on its inner circumferential surface, a cam surface for pressing each chucking claw towards the inner side, in the radial direction, as the rotary cam rotates in one direction with respect to the inner ring. In a further aspect of the invention, there may be additionally provided on the outer surface of the housing an electrode tip holder for holding new electrode tips.

After an electrode tip is inserted through the throughhole in the housing, the chuck member is closed to hold the electrode tip and the chuck member is then turned. The rotational torque of such turning is transmitted to the electrode tip via the chuck member and the electrode tip is twisted. This twisting loosens the electrode tip, so that the electrode tip can be easily pulled out from the gun arm by moving the gun arm away from the housing.

With the chuck member arranged according to the second aspect of the invention, the rotary cam is rotated in one direction by the driving source to first press the chucking claws inwardly toward the inner side, in the radial direction and then close the chucking claws and the chuck member. The chuck member is rotated together with the rotary cam so that the opening/closing and the rotational operations of the chuck member can be carried out by the same single driving source.

After the electrode tip is pulled out as described above, a new electrode tip, to replace the old tip, is attached to the gun arm. With an electrode tip holder provided on the outer surface of the housing, according to the third aspect of the invention, the travel distance of the gun arm required for replacing the old tip with the new tip can be shortened to make the tip replacement operation carried out with the apparatus of the instant invention of higher efficiency.

DETAILED DESCRIPTION OF THE INVENTION

EMBODIMENT

Figure 1:
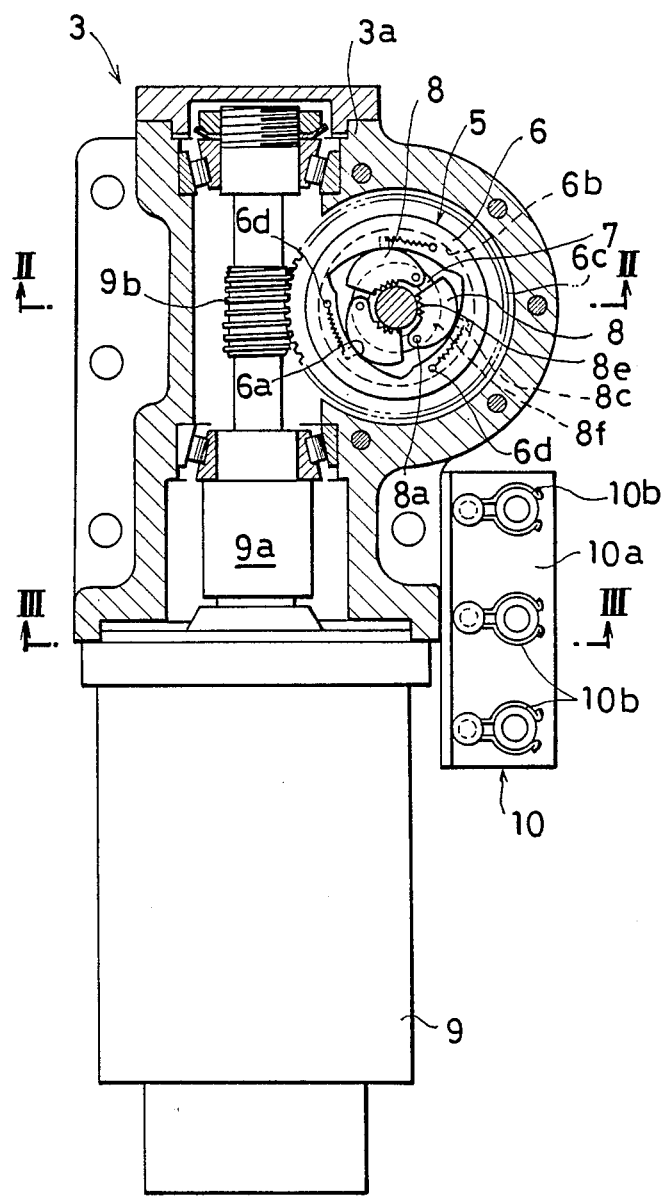
FIG. 1 is a top plan view, partially sectioned, of an apparatus according to this invention.
Figure 2:
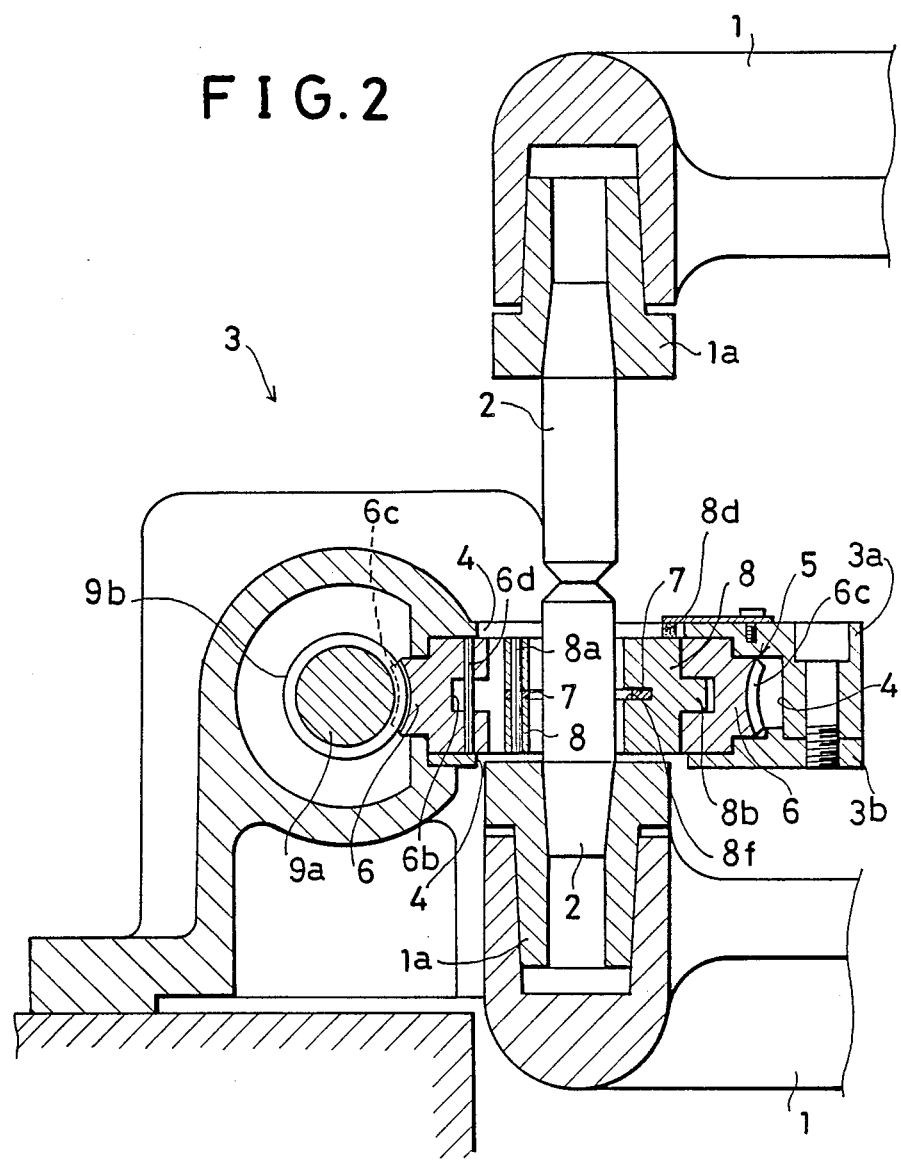
FIG. 2 is an enlarged sectional view taken along the II—II line in FIG. 1.

Referring to FIGS. 1 and 2, reference numeral 1 denotes each arm of a paired gun arms of a welding gun, and reference numeral 2 denotes the electrode tip attached to the front-end holding portions 1a, 1a of each of the gun arms 1, 1. The welding gun is mounted on a robot, not shown, to carry out an automatic welding operation. When the electrode tips 2, 2 are worn out and are no longer usable, the welding gun is moved to an electrode tip replacement site located within the operational range of the robot so as to replace the electrode tips with new tips.

Reference numeral 3 designates a housing disposed at the tip replacement site. A through-hole 4, FIG. 2, extends through the upper side of an extension 3a on side of the housing 3 and through a cover plate 3b on the lower side thereof. Through-hole 4 permits the electrode tip 2 to be inserted therethrough. A chuck member 5 for holding the electrode tip 2 is provided in the extension 3a and may be concentric with the through-hole.

The chuck member 5 comprises a ring-shaped rotary cam 6 rotatable about a vertical axis which is coaxial with that of the through-hole 4, an inner ring 7 which is disposed along the inner circumference of the rotary cam 6 and relatively rotatable with respect to the cam, and three chucking claws 8 pivotally attached to the inner ring 7, respectively, through pins 8a so as to be swingable in the radial direction. On the outer circumferential surface of the rotary cam 6 gear teeth are formed which engage with worm gear 9b on an output shaft 9a of a motor 9, FIG. 1, mounted on an end portion of the housing 3. The rotary cam 6 is reversible in rotational directions by reversing motor 9. On the inner circumferential surface of the rotary cam 6 are formed a cam surface 6a facing the radially outer side surface of each chucking claw 8 and a groove 6b receiving a projection 8b provided on the outer side surface of each chucking claw 8. Each chucking claw 8 may be urged toward the opening side, that is, the outer side in the radial direction, by spring 8c provided in the groove 6b, the spring 8c being connected at one end thereof to the projection 8b and at the other end thereof to a pin 6d securely fixed to the rotary cam 6. On the upper surface of the extension 3a, a damping piece 8d resiliently contacts the chucking claws 8.

When the rotary cam 6 is rotated in the regular rotational direction, counterclockwise direction in FIG. 1, relative rotation of the rotary cam 6 with respect to each chucking claw 8, held stationary by the frictional force of the damping piece 8d, causes each chucking claw 8 to be pressed to the cam surface 6a and swing to the closing side, radially the inner side. Thereafter, each chucking claw 8 is caused to rotate together with the rotary cam 6. Thus, the closing and the rotational operations of the chuck member are carried out successively. When the rotary cam 6 is rotated in the reverse rotational direction, that is, the clockwise direction in FIG. 1, each chucking claw 8 is urged by the spring 8c and caused to swing to the opening side, that is, radially to the outer side, so that the chuck member is opened.

On the radially inner side surface of each chucking claw 8 there is provided a serrated projection 8e that makes the claw grasp, more securely, on the electrode tip 2, and a clearance groove 8f to receive the inner ring 7.

Figure 3:
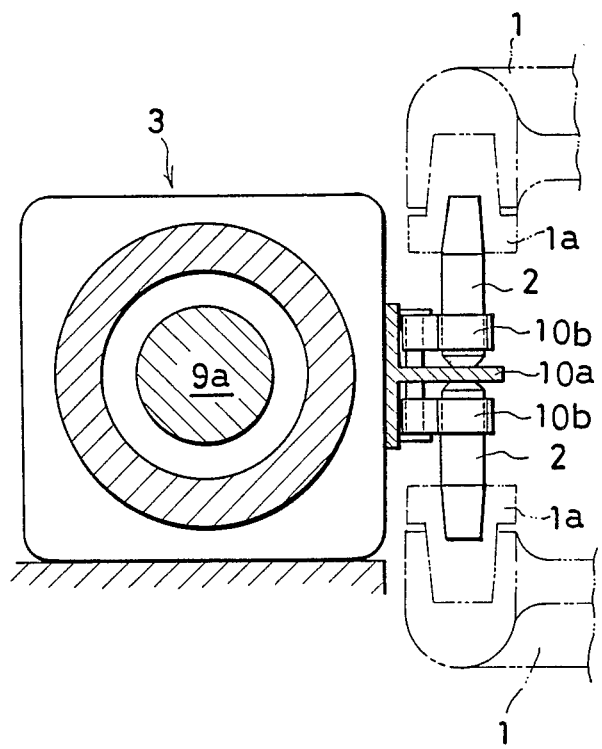
FIG. 3 is a sectional view taken along the III—III line in FIG. 1.

In addition, there is provided, on the outer surface of the housing 3, adjacent to the extension 3a, an electrode tip holder 10. In an embodiment example as shown in FIGS. 1 and 3, the holder 10 is arranged so as to comprise an intermediate seat plate 10a which receives the end surfaces of the electrode tips and three holder members 10b provided on each side above and below the intermediate seat plate in order to hold the electrode tips 2, the holder members being made of a spring plate.

Operation of the apparatus according to this embodiment example will now be explained in more detail. To replace an electrode tip with another tip, the welding gun is moved to the tip replacement site and operated to close the gun arms 1 so as to place the electrode tip 2 attached to the holding portion 1a of one of the gun arms 1 in the through-hole 4 in the extension 3a of the housing 3. Thereafter, the rotary cam 6 is rotated in the regular rotational direction. Through this operation, the chuck member 5 is closed and rotated. The rotational torque is transmitted to the electrode tip 2 via the chuck member 5 to loosen the holding portion 1a and the electrode tip 2. Next, the gun arms 1, 1 are opened to pull the electrode tip 2 from the holding portion 1a. The rotary cam 6 is then rotated in the reverse direction to open the chuck member 5 and the electrode tip 2 to fall therefrom. Then, the electrode tip 2 attached to the holding portion 1a of the other of the gun arms 1 is inserted into the extension 3a of the housing 3 and the same operation as described in the foregoing is repeated to remove the electrode tip 2 from such other of the gun arms.

Following the above operation, the welding gun is moved toward the tip holder 10 and operated to close the gun arms 1, 1 on the new electrode tips 2, 2 held by a pair of the upper and lower holder members 10b, 10b. The new electrode tips 2, 2 are, thus, attached to the holding portions 1a, 1a of both the gun arms 1, 1.

ADVANTAGES OF THE INVENTION

As described in the foregoing, according to the first aspect of the present invention, the electrode tip is turned via the chuck member to loosen the electrode tip, so that the electrode tip can be easily pulled out from the gun arm without subjecting the gun arm to an undue or excessive force. It is not necessary to make an electrode tip specially provided with an engagement portion, as required in the prior art. Thus, the manufacturing cost are reduced.

Further, according to another aspect of the present invention, a single driving source can operate the chuck member to open, close and rotate. Thus, a separate driving source for the opening/closing operation is not necessary. This brings about simplification of the structural arrangement and results in lower cost. Furthermore, a tip holder for holding new electrode tips is provided on the outer surface of the housing in which the chuck member is housed. Hence, the electrode tip replacement operation to attach a new electrode tip in place of the old one can be carried out speedily after the old electrode is removed. This contributes to improvement of work efficiency with respect to the electrode tip replacement.

The terms and expressions which have been employed in the foregoing description are used as terms of description and not of limitation, and there is no intention, in the use of such terms and expressions, of excluding any equivalents of the feature shown and described or portions thereof, but it is recognized that various modifications are possible within the scope of the invention claimed.

What is claimed:
1. An electrode tip replacement apparatus for welding gun comprising;
    a housing having a through-hole through which an electrode tip attached to a gun arm of a welding gun can be inserted;
    a chuck member for holding said electrode tip, said chuck member being housed in said housing concentrical with said through-hole; and
    a driving source for rotating said chuck member;
    said chuck member comprising a ring-shaped rotary cam rotated by said driving source, an inner ring disposed along the inner circumference of said rotary cam and relatively rotatable with respect to said cam, and a plurality of chucking claws pivotally attached to said inner ring so as to be swingable in a radial direction, said rotary cam having a cam surface formed on its inner circumferential surface, said cam surface acting to press each of said chucking claws inwardly in the radial direction in said through-hole as said rotary cam rotates in one direction with respect to said inner ring.
2. An electrode tip replacement apparatus for a welding gun as set forth in claim 1, wherein there is mounted on the outer surface of said housing an electrode tip holder for holding new electrode tips.

* * * * *